(12) United States Patent
Conroy

(10) Patent No.: US 6,241,633 B1
(45) Date of Patent: *Jun. 5, 2001

(54) HOCKEY STICK SHAFT AND METHOD OF MAKING THE SAME

(75) Inventor: James Conroy, Dublin (IE)

(73) Assignee: Christian Brothers, Inc., Warroad, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,514

(22) Filed: Feb. 20, 1998

(51) Int. Cl.[7] .................................................. A63B 59/14
(52) U.S. Cl. ............................................................. 473/561
(58) Field of Search ..................... 473/561–563, 473/FOR 189

(56) References Cited

U.S. PATENT DOCUMENTS 5,303,916 * 4/1994 Rodgers ............................... 473/562

FOREIGN PATENT DOCUMENTS

896690 * 3/1972 (CA) ............................ 473/FOR 189
3238117 * 6/1983 (DE) ............................ 473/FOR 189

OTHER PUBLICATIONS

One page Nike™ hockey stick description; two pages of pictures.

* cited by examiner

*Primary Examiner*—Mark S. Graham
(74) *Attorney, Agent, or Firm*—Dorsey & Whitney LLP

(57) ABSTRACT

A hockey stick shaft having a cross-sectional configuration with a pair of flat sides and substantially circular top and bottom edges, a hockey stick shaft adapted for receiving a replacement blade and have a plurality of layers of unidirectional fibers.

1 Claim, 2 Drawing Sheets

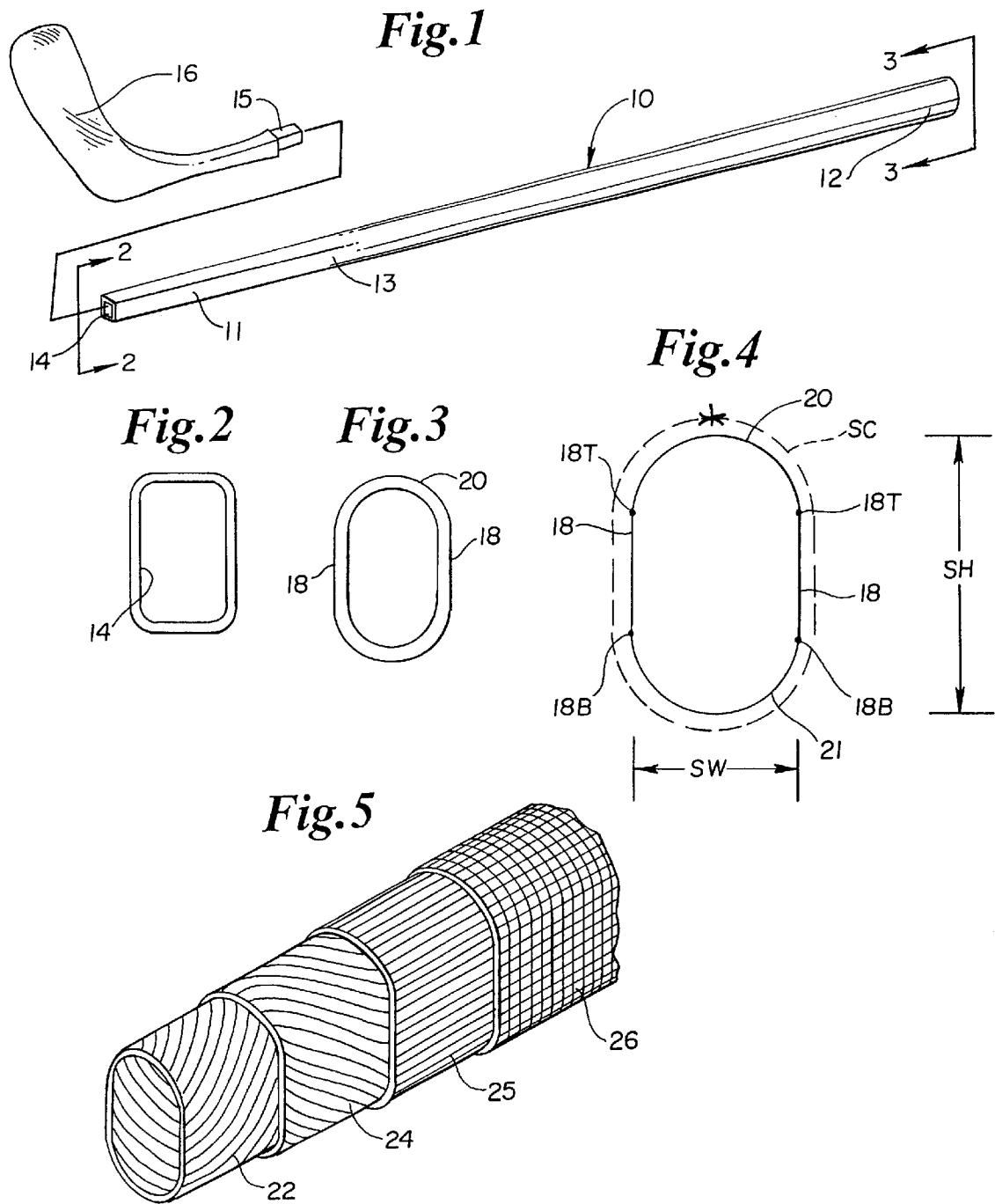

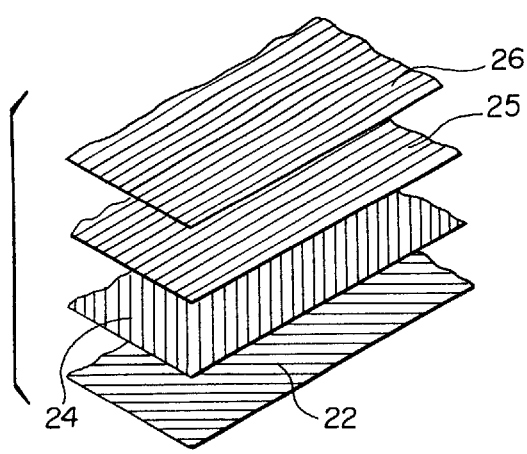
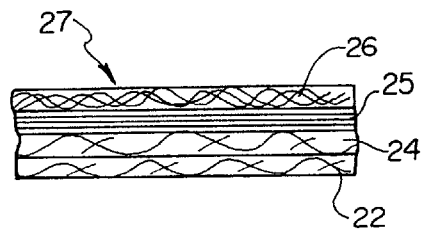
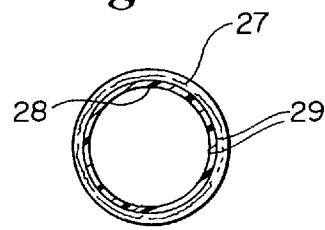
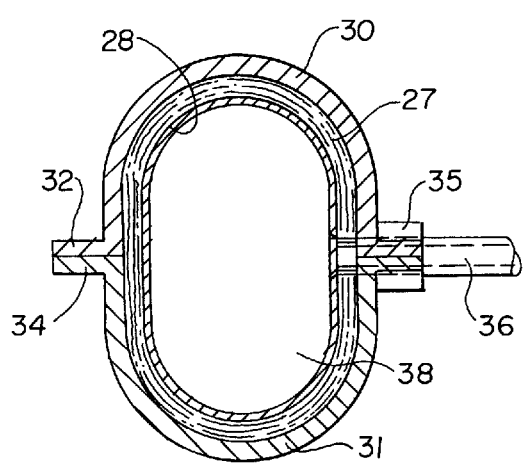
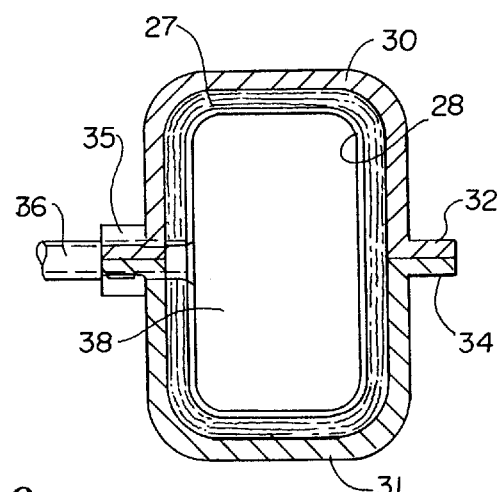
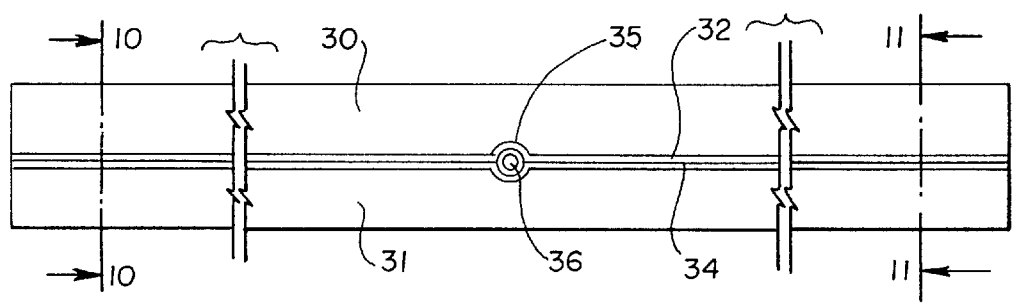

HOCKEY STICK SHAFT AND METHOD OF MAKING THE SAME

BACKGROUND OF THE INVENTION

1. Field of the Invention

The present invention relates generally to the field of hockey sticks and the like and more particularly, to a fiber reinforced composite hockey stick shaft adapted for receiving a replacement blade at one end. The invention also relates to an improved cross-sectional configuration for a fiber reinforced composite hockey stick shaft and a process for making such a shaft.

2. Description of the Prior Art

Hockey sticks in general, and ice hockey sticks in particular, have experienced dramatic changes throughout the years. As a result, ice hockey sticks have changed from plain wooden sticks having straight blades and handles to significantly improved sticks having curved blades and being reinforced with fiber-glass or the like. However, regardless of the particular stick construction and reinforcement, the great majority of sticks continue to have a generally rectangular cross-sectional configuration. Although stick configurations other than rectangular, such as oval or rectangular with rounder corners have been tried, these other configurations have not proven to be particularly popular with hockey players.

Significant evolution has also occurred in the construction of the stick itself. Initially both the handle and blade portions were constructed of wood and were joined with one another through various processes to form a single, integral stick. As technology developed, metal hockey stick shafts, particularly aluminum shafts, have been introduced. Such shafts included an elongated handle portion constructed of a tubular section of aluminum or other lightweight metal and are adapted for connection with a replacement blade. The replacement blades are usually purchased separately from the handle or shaft and include a blade portion and a shaft connecting end designed for connection through various adhesive means or the like to the aluminum handle. When a blade breaks or wears out, the blade is replaced with a new one.

More recent developments relating to ice hockey sticks have included the introduction of plastic or composite shafts. Plastic or composite shafts, like aluminum shafts, are elongated, generally hollow, and are designed for connection with a replacement blade. A variety of methods have been utilized in the construction of such shafts including, among others, pultrusion processes as exemplified by U.S. Pat. No. 4,086,115 issued to Sweet et al. and wrapping processes as exemplified by U.S. Pat. No. 4,591,155 issued to Adachi. Although a relatively large number of plastic or composite shafts are currently available, they have not been widely accepted as a replacement for aluminum shafts or for the traditional wooden hockey stick. The reasons are believed to be related to the relatively strict functional requirements of such a shaft as well as the cost.

First, the shaft must be relatively lightweight to simulate a traditional wooden stick, yet exhibit sufficient strength to withstand the stresses placed on the shaft by the hockey player. Such stresses occur throughout the entire length of the shaft, but particularly at or near the point at which the blade is secured to the lower end of the shaft. Such stresses are increased and the problems compounded as a result of the continuing popularity of the slap shot and the presence of bigger and stronger players.

Second, a shaft must reasonably simulate the flexural characteristics of a wooden stick or be capable of exhibiting the flexural characteristics desired by particular players.

Third, the shaft must meet established safety standards. This generally means that the shaft must be capable of breaking under certain loads and must break in a manner which is no more dangerous to the user or other players than a traditional wooden stick.

Fourth, the shaft must be cost effective so that it can compete favorably with the traditional wooden sticks and with aluminum shafts and replacement blades.

Although various efforts have been made, and continue to be made, to design a composite hockey stick shaft to meet the above objectives, few, if any, have been totally successful. Accordingly, there is a continuing need in the art for a composite hockey stick shaft which provides the desired flexural and other characteristics for stick performance, which meets acceptable safety standards and which is cost effective.

SUMMARY OF THE INVENTION

One aspect of the present invention relates to a composite hockey stick shaft with a novel construction which is adapted for receiving a replacement blade at one end. A second aspect of the present invention relates to a composite hockey stick shaft with a unique cross-sectional configuration. A third aspect of the present invention is to provide a process for making such a shaft. In the preferred structure, the shaft of the present invention is an elongated, hollow shaft in which the major portion of the length has a unique cross-sectional configuration. This configuration includes generally flat sides and curved top and bottom edges which are distinguished from conventional shafts with generally rectangular cross-sectional configurations.

Traditional hockey sticks have generally rectangular cross-sectional configurations with a relatively small radius at each corner. Throughout the years, others have experimented with the cross-sectional configuration by providing hockey sticks with oval or modified rectangular configurations or the like. Recently, others have provided sticks with increased radii at each corner of the stick. However, these radii are not sufficiently large to eliminate any of the flat areas on the stick. Further, the circumference of such modified configuration is less than that of a traditional stick. Accordingly, the present invention provides a handle with a unique cross-sectional configuration which eliminates the flat areas on the top and bottom edges of the stick and which more closely fits the curve of the player's hand.

In general, the process of making the shaft in accordance with the present invention includes first laying up various fiber reinforced layers or plies in a resin matrix. Each of the plies is preferably pre-cut so that the plies can be laid, one on top of the other, on a lay-up table or other substrate. Preferably, the fibers of the various plies are oriented at +45°, −45°, and 0°, with an outer woven ply having fibers oriented at 0 and 90°.

The laid up matrix is wound onto a mandrel supported bladder for one revolution and is then cut longitudinally so that the longitudinal ends of the matrix butt against one another. Next, the mandrel with the supported bladder and matrix wound thereon is positioned in a two part pre-mold structure corresponding to the desired exterior surface configuration of the shaft. In the preferred embodiment, this configuration has a pair of sides and top and bottom edges in which each of the sides include a flat portion and the top and bottom edges include only a curved or radius portion. Further, the circumference of the shaft configuration is such that it is equal to or greater than the circumference of a conventional rectangular hockey stick shaft. In other words, the circumference of the shaft in accordance with the present invention is at least as great as the circumference of a conventional rectangular shaft.

After positioning the bladder in the pre-mold, the mold is heated and the bladder is inflated. This inflation squeezes the resin impregnated fiber plies outwardly against the inner walls of the mold cavity. This inflation is performed under a specified level of heat to at least partially cure the resin to provide a preformed shaft. After a pre-determined period of time, the preformed shafts are removed from the first molds and placed into a second, master mold, having exact external dimensions of the desired final product. The bladder is again inflated under significantly higher pressures and higher curing temperatures to finally squeeze out the remaining excess resin and cure the remaining resin. When the curing process is complete, the shaft is removed from the master mold and trimmed to the desired length.

Accordingly, it is an object of the present invention to provide an improved plastic or composite hockey stick shaft adapted for receiving a replacement blade.

Another object of the present invention is to provide an improved plastic/composite hockey stick shaft which exhibits increased strength, but is lighter than other sticks and which embodies desired flexural characteristics.

Another object of the present invention is to provide a method of making the hockey stick as described above.

A still further object of the present invention is to provide a hockey stick shaft with a cross-sectional configuration which more closely fits the curvature of the players' hands.

These and other objects of the present invention will become apparent with reference to the drawings, the description of the preferred embodiment and the appended claims.

DESCRIPTION OF THE DRAWINGS

FIG. 1 is a perspective, fragmented view of a hockey stick shaft and replacement blade in accordance with the present invention.

FIG. 2 is an elevational end view of the hockey stick shaft of the present invention as viewed along the lines 2—2 of FIG. 1.

FIG. 3 is an elevational end view of the hockey stick shaft of the present invention viewed along the lines 3—3 of FIG. 1.

FIG. 4 is an enlarged view reflecting the exterior cross-sectional configuration of the major portion of the length of the shaft in accordance with the present invention.

FIG. 5 is an isometric, fragmentary view of a portion of the hockey stick shaft of the present invention, with portions broken away.

FIG. 6 is an exploded view showing the lay-up of the various fiber layers or components making up the shaft of the present invention.

FIG. 7 is an edge view of the fiber lay-up showing the various fiber layers.

FIG. 8 is a cross-sectional configuration showing the fiber matrix wound around the inflatable bladder.

FIG. 9 is an elevational side view of a molding apparatus used to construct the hockey stick shaft in accordance with the present invention.

FIG. 10 is a view, partially in section, as viewed along the section line 10—10 of FIG. 9.

FIG. 11 is a view, partially in section, as viewed along the section line 11—11 of FIG. 9.

DESCRIPTION OF THE PREFERRED EMBODIMENT

With reference to FIG. 1, the shaft 10 of the present invention is elongated and includes a replacement blade connection end 11, a free end 12 and a main body portion with a major portion having the cross-sectional configuration as shown in FIGS. 3 and 4. The blade connection end 11 has an interior configuration 14 with a generally rectangular cross-sectional configuration to permit the end 11 to receive the rectangular cross-sectional configured tenon 15 of a conventional replacement blade 16.

FIGS. 2 and 3 show the cross-sectional configuration of the replacement blade connection end 11 and the free end 12, respectively. FIG. 2 shows the blade connection end 11 with the generally rectangular interior configuration 14. This is designed for receiving the generally rectangular tenon 15 of the replacement blade 16. FIG. 3 shows the free end 12 with the cross-sectional configuration comprising a pair of flat spaced sides 18, 19 and top and bottom curved or radiused edges 20, 21, respectively. Preferably, the configuration shown in FIG. 3 extends throughout the major length of the shaft 10 which extends from the free end 12 for at least half the length of the shaft 10 and more preferably from the free end 12 for at least ¾ or 75% of the length of the shaft 10. It is intended that the cross-sectional configuration shown in FIG. 3 should extend from the free end 12 for a sufficient distance along the shaft so that both of the player's hands are always on this portion of the stick. As shown in FIG. 1, the shaft 10 includes a shaft transition point shown by the reference character 13 in which the configuration illustrated in FIG. 3 begins to taper into the rectangular configuration of FIG. 2.

FIG. 4 illustrates the detailed exterior configuration of the hockey stick shaft in accordance with the present invention. As shown, the preferred configuration of the major portion of the shaft in accordance with the present invention includes a shaft height dimension SH, a shaft width dimension SW and a shaft radius dimension SR. The shaft circumference dimension SC is defined by the circumference of the shaft configuration illustrated in FIGS. 3 and 4.

The shaft dimensions SH, SW and SR are selected so that the shaft circumference SC is preferably greater than, and in no case less than the circumference of a conventional hockey stick shaft of rectangular configuration. Such a conventional rectangular cross-sectional configuration is essentially illustrated in FIG. 2. The width dimension SW and height dimension SH are also preferably greater than the corresponding width and height dimensions of a conventional stick as shown in FIG. 2. As shown in FIG. 2, the shaft width of a standard rectangular shaft is about 20 mm and the shaft height is about 30 mm. In contrast, the shaft width SW of the preferred inventive configuration is 21.5 mm, while the shaft height SH is 32. Further, the shaft radius SR is selected so that it is preferably approximately ½ the shaft width SW. As shown, this results in the top and bottom edges 20 and 21 being curved surfaces with no substantially flat portion. In contrast, the sides 18,18 are comprised of flat portions which intersect with the shaft radius from the top and bottom edges 21,22 as shown in FIG. 4. This particular and specific cross-sectional configuration results in a shaft which fits the curve of the players hand and provides improved puck control and feel.

More specifically, the cross-sectional configuration of the major portion of the shaft as shown in FIG. 4 comprises the pair of generally parallel flat side surfaces 18,18 which are spaced from one another by the shaft width dimension SW. Each of these side surfaces 18,18 includes a top side edge 18T and a bottom side edge 18B. The top surface has a generally circular configuration with a radius SR. The top edge 20 includes a top surface edge joining the top side edge 18T of one of the side surfaces 18 and a second top surface edge joining the top side edge 18T of the other of the side surfaces 18. The radius SR of the top edge is equal to one half of the shaft width SW. Similarly, the bottom edge 21 includes a first bottom edge joining a bottom side edge 18B of one of the side surfaces 18 and a second bottom edge joining a bottom side edge 18B of the other of the side surfaces 18. The bottom edge also comprises a generally circular cross-sectional configuration with a radius SR which in the preferred embodiment is one half of the shaft width dimension SW. With the above relationships, the flat part of the sides 18 is approximately equal to the shaft height SH minus the shaft width SW.

Although the preferred embodiment shows the above described shaft configuration used in connection with a plastic or composite shaft suitable for receiving a replacement blade, it is contemplated that the shaft configuration has benefits useful with other types of hockey sticks and hockey stick shafts as well. For example, the invention relating to the shaft configuration has applicability to a wooden shaft with integral blade as well as to aluminum or other metal shafts.

The basic construction of the hockey stick shaft in accordance with the present invention is illustrated in FIG. 5. As shown, the shaft is a generally elongated, hollow structure having a thin wall comprised of a plurality of fiber layers. In the preferred embodiment, as shown in FIG. 5, the wall is comprised of one or more layers 22 of unidirectional fibers oriented at +45°, one or more layers 24 of unidirectional fibers oriented at −45°, one or more layers of unidirectional fibers oriented at 0° and one or more layers 26 of woven fibers with orientation at 0°/90°. Preferably these fiber layers 22, 24, 25 and 26 are all resin impregnated or are provided in a curable resin matrix so that when the shaft is molded in accordance with the present invention, the resin is cured and the fibers are pressed together to form the wall of the shaft.

The process of making the hockey stick shaft 10 in accordance with the present invention is illustrated best with reference to FIGS. 6–11. The first step in the process includes laying up the various fiber layers or plies (sometimes also referred to as fiber mats) which are provided in a curable resin matrix. As shown in FIG. 6, the fiber lay-up structure is generally comprised of four fiber layers or plies 22, 24, 25 and 26. Each of these plies includes fibers which are oriented in different directions so as to provide different strength, flex and other characteristics to the finished shaft. Specifically, the fiber layer 22 comprises unidirectional fibers which are oriented at about a +45° angle relative to the longitudinal axis of the shaft. This layer 22 can comprise one or more separate layers of such fibers. Layer 24 is similar to the layer 22 in that it may comprise one or more layers of unidirectional fiber; however, the fibers in the layer 24 are oriented at −45°. Layer 25 is similar to the layers 22 and 24 in that it may comprise one or more layers of unidirectional fibers; however, the fibers in the layer 25 are oriented at 0° or in line with the longitudinal axis of the shaft. The outer layer 26 is preferably comprised of one or more layers of woven fiber with fibers oriented at both 0° and 90°.

Preferably, all of the fibers in the layers 22, 24 and 25 are the same except for their orientation. Specifically, these fibers are resin impregnated or contain a resin matrix and are unidirectional carbon fibers. A fiber commonly used is a carbon fiber with a filament count of 12k. Typical modulus of the fiber for the layers 22, 24, 25 and 26 is $280-300 \times 10^6$ p.s.i. and the tensile strength of such fiber is $480-500 \times 10^3$ p.s.i. The resin used in the fiber matrix is epoxy resin prepared by the condensation of Bisphenol A (4,4'- Isoproplidene Diphenol) and Epichloro Hydrin. The layer 26 is comprised of one or more layers of woven carbon fibers impregnated with epoxy resin.

In the process, each of the plies or layers 22, 24, 25 and 26 is pre-cut so that they can be laid, one on top of the other on a table or other substrate at the desired orientation of the fibers. For example, each of the +45°, −45°, 0° and 0/90° layers would be separately laid one on top of the other to provide the desired orientation. Elongated strips of this laid up material are then cut for assembly into the shaft of the present invention. These elongated strips have a generally rectangular configuration with a length slightly longer than the desired length of the finished shaft and a width approximating the desired shaft circumference SC (FIG. 4). When positioned together, a side view of the laid up strip appears as is shown in FIG. 7.

Next, an elongated, generally rectangular strip 27 of laid up fiber is wrapped around an inflatable bladder 28 as shown in FIG. 8, with longitudinal edges 29 of the laid up strip 27 butting against one another as shown. Although not necessary, during this lay-up step, a steel mandrel (not shown) may be inserted internally of the inflatable bladder 28 to assist in supporting the same while the laid up strips 27 are wrapped. The laid up material strips 27 are then molded into the shaft of the present invention in accordance with the procedure described below.

Preferably the process of the present invention involves two molding operations and utilization of two molds, namely, a pre-mold for preliminary molding and curing of the shaft and a final or master mold for final curing and forming of the shaft. Both are similar in structure in that they are two part molds and define a mold cavity of desired shape. Preferably, however, the pre-mold is constructed of a fiber glass or similar material which is capable of withstanding limited heat and pressure conditions, while the final or master mold is constructed of steel which is sufficient to withstand significantly higher pressures and curing temperatures. In some cases, however, it is contemplated that a single molding step will suffice. In accordance with the preferred process, however, the laid up strip 27 which is mounted on the bladder 28 is loaded into a two part pre-mold as illustrated best in FIGS. 9, 10 and 11. As shown, each of the molds includes an upper mold part 30 and a lower mold part 31. Each of the mold parts 30 and 31 is provided with a peripheral flange 32 and 34, respectively, for securing the mold parts 30 and 31 together. When the upper and lower parts 30 and 31 are secured together, they form an interior cavity 38 for receiving the bladder 28 with a laid up strip 27. When the bladder 28 and laid up strip 27 of FIG. 8 is positioned within the interior cavity 38, a mold cavity is formed between the bladder 28 and the interior molding surfaces of the upper and lower parts 30 and 31.

The bladder is preferably formed of a syntex rubber material and, as shown best in FIGS. 10 and 11, includes a tube 36 extending outwardly through an opening 35 in the mold parts 30 and 31 so that pressure can be introduced into the interior of the bladder to inflate the same.

As illustrated in FIGS. 9, 10 and 11, and in particularly by a comparison of FIGS. 10 and 11, the internal mold cavity has a configuration conforming to the desired external configuration of the shaft illustrated in FIG. 1. Thus, FIG. 10 represents that portion of the mold defining the free end 12 of the shaft and the major portion of the shaft length and FIG. 11 represents that portion of the mold which defines the replacement blade connecting end 11 with the generally rectangular external configuration.

The initial molding step according to the invention involves positioning the bladder and laid up strip 27 of FIG. 8 within the mold cavity 38. The upper and lower mold parts 30 and 31 are then secured together. This is done in such a way that the tube 36 of the bladder extends through the opening 35 in the mold.

The bladder 28 is then inflated to a pressure of approximately 150 p.s.i. and the mold is placed in an oven in which the temperature is maintained at about 135° C. for approximately 20 minutes. During this time, the resin of the fiber plies softens and is forced outwardly by the bladder to fill all the voids in the mold cavity. At the conclusion of the above molding period, the mold is removed from the heat source and placed in a chilled environment at a temperature in the range of −4° C. to 10° C. for a period of about 10 minutes for quenching.

Next, the pre-formed shaft together with the bladder, is removed from the pre-mold and placed into the interior cavity of the final or master mold. The two halves of the master mold are secured together with the tube 36 of the bladder extending through the opening 35 in the mold. The bladder is then again inflated, this time to a pressure of at least about 150 p.s.i. and the temperature of the mold is raised to a curing temperature of at least about 140° C. These conditions are maintained for about 20 minutes.

Following the above heating step, the master mold is preferably cooled by circulating cooling water through the mold at a temperature in the range of about 5° C. for a period of 3–5 minutes. This reduces the temperature of the molded shaft to about 10° C. The mold is then separated and the molded shaft and bladder removed from the cavity. The bladder is then removed from the molded shaft and the shaft is trimmed to its desired length.

Accordingly, the method of the present invention involves laying up a plurality of resin impregnated unidirectional layers of carbon or other fiber material and positioning the laid up layers of fibers around an inflatable bladder in a mold cavity. Next, a mold is provided with an internal mold surface conforming to the desired exterior configuration of the hockey stick shaft. The bladder is then inflated to compress the layers of fiber and resin against the internal walls of the mold and the mold is heated to a curing temperature to cure the resin. The final step involves removing the molded shaft from the mold, removing the bladder from the shaft and trimming the shaft.

Although the description of the preferred embodiment is quite specific, it is contemplated that various modifications could be made without deviating from the spirit of the present invention. Accordingly, it is intended that this scope of the present invention be dictated by the appended claims rather than by the description of the preferred embodiment.

What is claimed is:

1. A hockey stick shaft having a desired exterior configuration, a longitudinal axis, a free end and a blade connection end for connection with a replacement blade, said shaft comprising:

an outer molded surface extending from said free end to said blade connection end and conforming to said desired exterior configuration;

an inner molded surface extending from said free end to said blade connection end, spaced inwardly from said outer molded surface and having a replacement blade receiving surface at said blade connection end; and a body portion disposed between said inner and outer molded surfaces and comprising a plurality of layers of unidirectional fibers in a resin matrix;

said plurality of layers includes one or more layers with unidirectional fibers oriented at +45° relative to said longitudinal axis, one or more layers with unidirectional fibers oriented at −45° relative to said longitudinal axis, and one or more layers with unidirectional fibers oriented at 0° relative to said longitudinal axis; and an outer layer of woven fibers with said woven fibers oriented at 0° and 90° relative to said longitudinal axis.

* * * * *